United States Patent
Roebuck et al.

(10) Patent No.: US 10,482,170 B2
(45) Date of Patent: Nov. 19, 2019

(54) USER INTERFACE FOR CONTEXTUAL DOCUMENT RECOGNITION

(71) Applicant: HRB Innovations, Inc., Las Vegas, NV (US)

(72) Inventors: Eric R. Roebuck, Shawnee, KS (US); Mary Clark, Lee's Summit, MO (US); Erik V. Lustig, Olathe, KS (US); David Jason Gregory Butler, Kansas City, MO (US)

(73) Assignee: HRB Innovations, Inc., Las Vegas, NV (US)

( * ) Notice: Subject to any disclaimer, the term of this patent is extended or adjusted under 35 U.S.C. 154(b) by 0 days.

(21) Appl. No.: 15/785,655

(22) Filed: Oct. 17, 2017

(65) Prior Publication Data
US 2019/0114313 A1 Apr. 18, 2019

(51) Int. Cl.
*G06F 17/24* (2006.01)
*G06K 9/00* (2006.01)
*G06K 9/34* (2006.01)

(52) U.S. Cl.
CPC ....... *G06F 17/243* (2013.01); *G06K 9/00449* (2013.01); *G06K 9/344* (2013.01); *G06K 2209/01* (2013.01)

(58) Field of Classification Search
CPC .. G06F 17/243; G06K 9/00449; G06K 9/344; G06K 2209/01
USPC .................................. 715/221, 224
See application file for complete search history.

(56) References Cited

U.S. PATENT DOCUMENTS

| | | | | |
|---|---|---|---|---|
| 6,651,217 B1* | 11/2003 | Kennedy | ............... | G06F 17/243 715/224 |
| 7,203,663 B1* | 4/2007 | Buisman | .............. | G06K 9/2054 705/38 |
| 7,916,972 B2* | 3/2011 | Meunier | ............ | G06K 9/00469 382/175 |
| 9,268,763 B1* | 2/2016 | Esho | ................. | G06F 17/30011 |
| 9,569,662 B1* | 2/2017 | Prulhiere | ............ | G06K 9/00449 |
| 2002/0107885 A1* | 8/2002 | Brooks | ............... | G06F 3/04883 715/224 |
| 2003/0110443 A1* | 6/2003 | Yankovich | ............. | G06Q 10/10 715/205 |
| 2004/0015070 A1* | 1/2004 | Liang | .................. | G06F 19/3481 600/407 |
| 2004/0190790 A1* | 9/2004 | Zuev | .................. | G06K 9/00456 382/291 |

(Continued)

OTHER PUBLICATIONS

"Automation;" Microsoft Computer Dictionary; 2002; Microsoft Press; Fifth Edition; p. 44.*

*Primary Examiner* — Andrew R Dyer
(74) *Attorney, Agent, or Firm* — Erise IP, P.A.

(57) ABSTRACT

Media and method for presenting a user interface for verifying automatically recognized information from forms. Embodiments of the invention may import an image of a form and break the form down into a series of bounding boxes, each including the value of a form item and a description and/or label for the form item. When making use of a particular value from the form image, embodiments of the invention may present the bounding box containing that value to the user, together with enough context for the user to verify that the correct item has been identified and that the automatically recognized value is correct.

20 Claims, 4 Drawing Sheets

(56) References Cited

U.S. PATENT DOCUMENTS

| | | | |
|---|---|---|---|
| 2005/0177783 A1* | 8/2005 | Agrawala | G06F 3/04883 |
| | | | 715/230 |
| 2007/0118391 A1* | 5/2007 | Malaney | G06Q 10/00 |
| | | | 382/229 |
| 2007/0133882 A1* | 6/2007 | Matsuno | G06Q 10/10 |
| | | | 382/209 |
| 2007/0168382 A1* | 7/2007 | Tillberg | G06F 17/30253 |
| 2007/0245227 A1* | 10/2007 | Hyland | G06Q 10/10 |
| | | | 715/234 |
| 2008/0082909 A1* | 4/2008 | Zuverink | G06F 3/0481 |
| | | | 715/224 |
| 2008/0273227 A1* | 11/2008 | Dattilo | H04N 1/38 |
| | | | 358/448 |
| 2009/0097077 A1* | 4/2009 | Swartz | H04N 1/00355 |
| | | | 358/474 |
| 2009/0097769 A1* | 4/2009 | Velasquez | G06F 17/243 |
| | | | 382/249 |
| 2009/0109455 A1* | 4/2009 | Smith | G06F 17/243 |
| | | | 358/1.9 |
| 2009/0150442 A1* | 6/2009 | Barnard | G06Q 30/02 |
| 2009/0210786 A1* | 8/2009 | Suzuki | G06K 9/00456 |
| | | | 715/243 |
| 2011/0131479 A1* | 6/2011 | Padgett | G06F 3/04895 |
| | | | 715/223 |
| 2012/0063684 A1* | 3/2012 | Denoue | G06F 17/243 |
| | | | 382/175 |
| 2013/0238965 A1* | 9/2013 | Barrus | G06K 9/00449 |
| | | | 715/223 |
| 2015/0135125 A1* | 5/2015 | Bhatt | G06F 3/0481 |
| | | | 715/781 |

* cited by examiner

USER INTERFACE FOR CONTEXTUAL DOCUMENT RECOGNITION

BACKGROUND

1. Field

Embodiments of the invention generally relate to automatic document importation and, more particularly, to methods of presenting automatically recognized values to a user for verification prior to use.

2. Related Art

Traditionally, when entering data from one form into another, a user would be required to identify the requested information, locate it in the source form, and copy that data into the destination form. With the advent of electronic form preparation, the last of these steps became easier, but the user was still required to locate and accurately transcribe the data from the source form into an electronic form preparation system. More recently, advances in optical character recognition have spared the user the task of transcribing the data. However, due to the imperfect accuracy of optical character recognition systems, the user is still required to locate the information in an image of the source form and verify that the recognized value is correct.

Furthermore, many such source forms include a large variety of information for the user to search through to verify a particular value. For example, tax forms may include dozens or even hundreds of individual values. Furthermore, a particular value may be located in a variety of places on the same form as issued by different vendors. Thus, the task of locating and verifying each value in turn may be laborious and time-consuming for the user. As such, an improved user interface is needed for directing the user's attention to the precise location of the relevant information so that the user can verify that the information is identified and recognized correctly.

SUMMARY

Embodiments of the invention address the above-described need by providing for a user interface for contextual document awareness. In particular, in a first embodiment, the invention includes one or more non-transitory computer readable media storing computer-executable instructions for a method of presenting a user interface for verifying automatically recognized information that, when executed receive a form image of a form, the form including plurality of values and a corresponding plurality of labels for the plurality of values, identifying a plurality of regions of the form image corresponding to the plurality of values, wherein each region of the form image contains an image of a value and a label corresponding to the value, for each of the plurality of regions, perform automatic recognition of the value and the label for the value to obtain an automatically recognized value for the region and an automatically recognized label for the region, determining a needed value from the form, identify a region of the plurality of regions of the form image corresponding to the needed value, and presenting a user interface to the user comprising the identified region of the form image corresponding to the needed value, an automatically recognized value for the identified region, an automatically recognized label for the identified region, a first control allowing the user to accept the automatically recognized value and an automatically recognized label as correct.

In a second embodiment, the invention includes a method of presenting a user interface for verifying automatically recognized information, comprising the steps of receiving a form image of a form, the form including plurality of values and a corresponding plurality of descriptions for the plurality of values, identifying a plurality of regions of the form image corresponding to the plurality of values, wherein each region of the form image contains an image of a value and a description corresponding to the value, determining a needed value from the form, identifying a region of the plurality of regions of the form image corresponding to the needed value, performing automatic recognition of the value and the description for the value for the identified region to obtain an automatically recognized value for the identified region and an automatically recognized description for the identified region, and presenting a user interface to the user comprising the identified region of the form image corresponding to the needed value, the automatically recognized value for the identified region; the automatically recognized description for the identified region, a first control allowing the user to accept the automatically recognized value as correct.

In a third embodiment, the invention includes one or more computer-readable media storing computer-executable instructions that, when executed perform a method of presenting a user interface for verifying automatically recognized information, the method comprising the steps of identifying a plurality of regions of a form image of a form, wherein the form includes plurality of values, and wherein each region of the plurality of regions corresponds to a value of the plurality of values, determining a needed value from the form, identifying a region of the plurality of regions of the form image corresponding to the needed value, performing automatic recognition of the value for the identified region to obtain an automatically recognized value for the identified region, and presenting a user interface to the user comprising the identified region of the form image corresponding to the needed value, the automatically recognized value for the identified region, a first control allowing the user to accept the automatically recognized value as correct.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
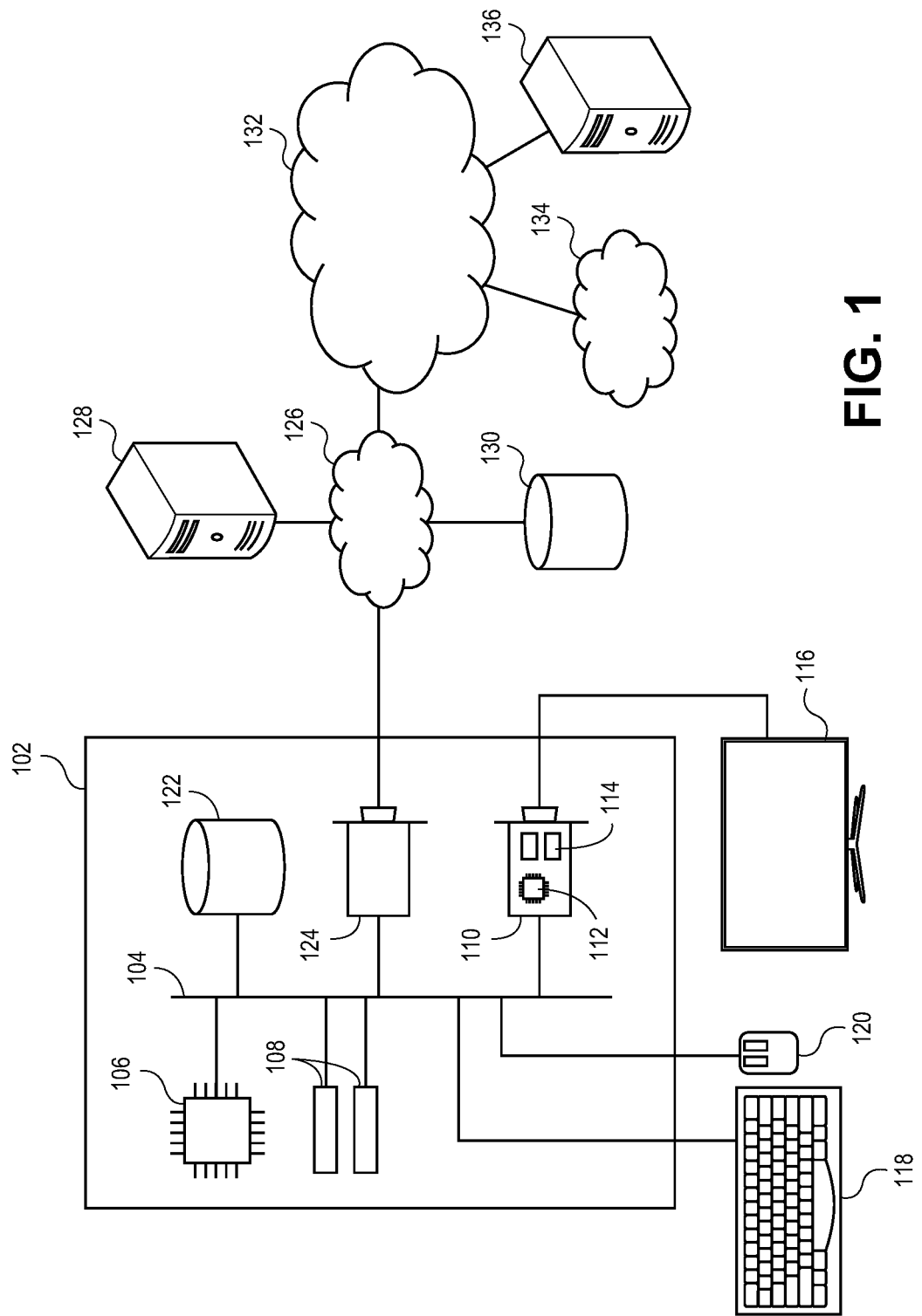
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention import an image of a form (e.g., a scanned document) and break the form down into a series of bounding boxes, each including the value of a form item and a description and/or label for the form item. When making use of a particular value from the form image, the bounding box containing that value is presented to the user, together with enough context for the user to verify that the correct item has been identified and that the automatically recognized value is correct.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or WI-FI (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and ACTIVE DIRECTORY, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
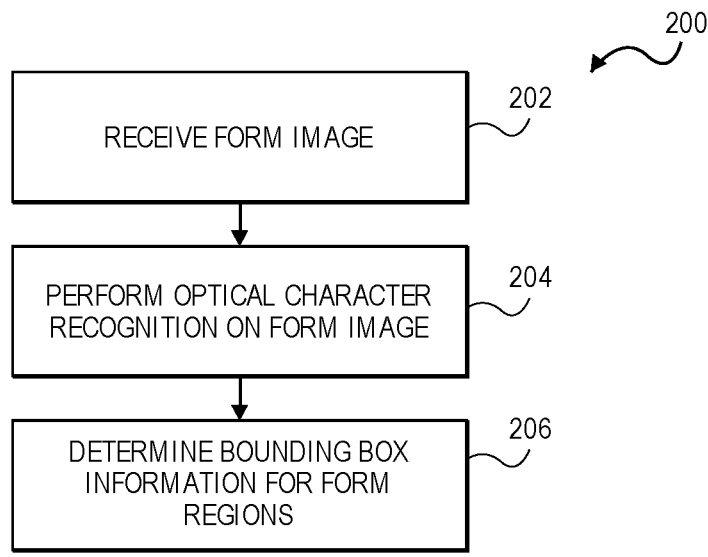
FIG. 2 depicts a flowchart depicting the operation of a method in accordance with embodiments of the present invention.

Turning now to FIG. 2, a flowchart depicting the operation of a method in accordance with embodiments of the present invention is depicted and referred to generally by reference numeral 200. Initially, at a step 202, an image of a form to be imported is received. Broadly speaking, the image of the form may be derived from any source. In some embodiments, the image is scanned from an original form document. In other embodiments, the image is a photograph of an original form document. In still other embodiments, the image is digitally generated, and no physical form document was created. In some embodiments, multiple forms may be received in the same image. For example, a bank may send a taxpayer a combined 1099 form including information for a 1099-DIV and a 1099-B. In such embodiments, the separate forms can be extracted from the single source image and processed separately. When images are subsequently presented to the user for verification (as described below), they will be extracted from the relevant portion of the combined form image.

Once the image is received, processing can proceed to step 204, where optical character recognition is performed on the received image. Any technique for the optical character recognition now known or later developed can be used to extract the character data for each region of the form image. For a typical form, character data may be present in a variety of regions of the forms (also called "boxes" of the form), and the data for each region can be separately extracted and identified appropriately.

For example, numerical data may be present in a number of boxes, where each box is labeled with information identifying the contents of the respective box. In some such embodiments, boxes may be include both a human-readable label and an unambiguous identifier such as a numeric or alphanumeric identifier, bar code, or other machine-readable indicium. For example, a W-2 income statement may contain boxes labeled "gross income" (box 1), "federal taxes withheld" (box 2), "state taxes withheld" (box 17) and so on. Furthermore, W-2 forms from a variety of tax form vendors or payroll providers may have the corresponding boxes located in different locations. As such, optical character recognition (or other machine recognition) may be performed on the box contents, the box identifiers, and the box labels. Broadly, the contents of a box will be located in close proximity to the label and/or identifier for the box. Thus, in some embodiments, the area below an area recognized as being the contents of a box is searched for a box label and the areas to left and right of the area recognized as being the contents of the box is searched for the box identifier. In some embodiments, the results of this process include a set of box data with contents, identifier, and label (or some subset of these) for each box present on the form. In some embodiments, the title of the form may be treated as a value and extracted, such that forms can be automatically identified without requiring the user to identify them.

Next, at step 206, bounding box information is determined for each region of the form from which data was extracted at step 204. In some embodiments, bounding box information comprises the x and y coordinates of two corners of the region. In other embodiments, the bounding box information comprises the x and y coordinates of all four corners of the region. In still other embodiments, the bounding box information comprises vertex information for an arbitrary polygonal region or information describing a circular or elliptical region. In some embodiments, bounding box information for different regions is non-overlapping. In other embodiments, the bounding box information for a region is expanded to provide context for the regions and, as such, may overlap. The bounding box information for the various regions can then be combined with the results of the optical character recognition process of step 202. In some embodiments, this combined information is permanently or temporarily stored for later processing; in other embodiments, processing proceeds immediately to the confirmation process 300 described below with respect to FIG. 3.

Figure 3:
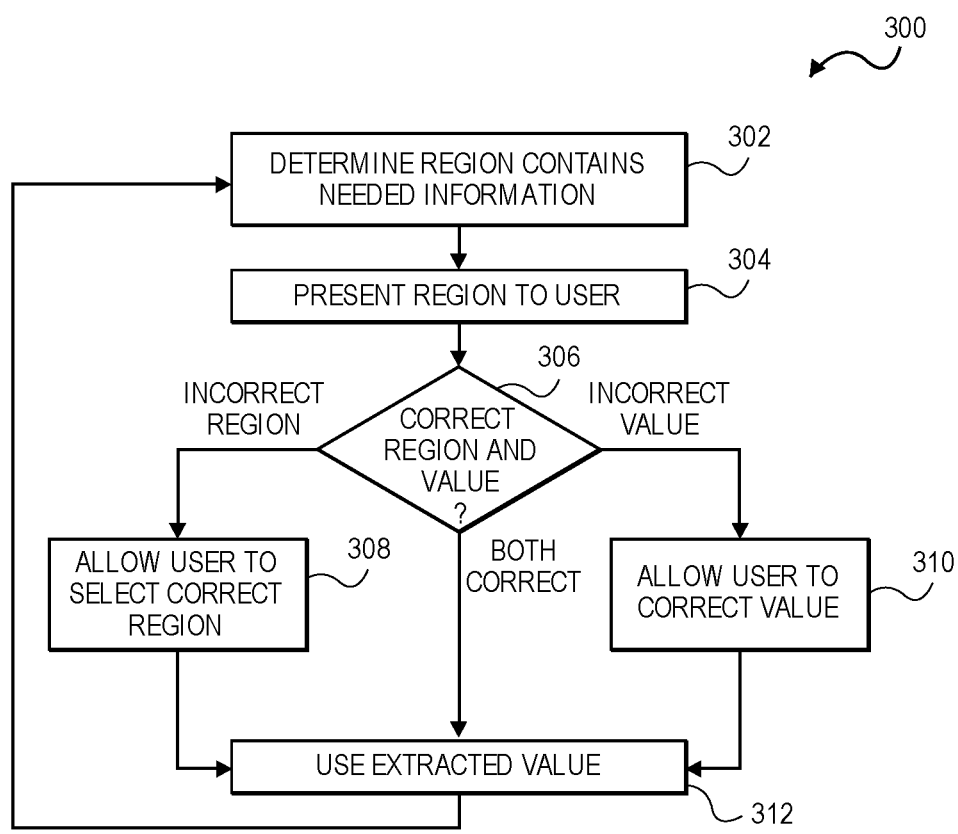
FIG. 3 depicts a second flowchart depicting a second method in accordance with embodiments of the invention.

Turning now to FIG. 3, a second flowchart depicting a second method in accordance with embodiments of the invention is depicted and referred to generally by reference numeral 300. Initially, at step 302, it is determined which region or regions contains information necessary. Continuing the example above, when using the information from a W-2 to prepare a tax return for a taxpayer, the gross income from box 1 must be entered on the taxpayer's 1040 form. However, as described above, box 1 may be located in different places on W-2 form from different vendors and payroll providers. As such, the information describing the various regions of the form image collected in method 200 must be processed to determine which region corresponds to box 1. In some embodiments, the information from the identifier for the region is used to determine whether the region contains the needed information. In other information, the label is used to determine whether the region contains the needed information. In still other embodiments, the contents of the regions are used to determine whether the region contains the needed information. In yet other embodiments, a combination of some or all of these factors is used to determine whether the region contains the necessary information.

For example, the information for a particular region might include the identifier "1," the label "Total Income" and the contents "$50,000." All of these would tend to indicate that the box corresponds to Box 1 of the W-2 form. If, however, an error during optical character recognition caused two boxes to have the identifier "1," one of which contains "$50,000" and has the label "Income" and one of which contains "John Smith" and has the label "Name." Embodiments of the invention may use loose pattern matching on the box label and/or expected content format (numeric vs. alphabetic) to disambiguate between the two candidates. Similarly, if an error in optical character recognition caused the identifier for the actual Box 1 to be misread such that no region has the identifier "1," then the box label and/or contents can be used to identify one or more candidate regions that may correspond to box 1.

Once the region containing the needed information has been identified, processing can proceed to step 304, where the region of the form image containing that information can be presented to the user for verification of accuracy. In some embodiments, the area of the form defined by the bounding box for the relevant region is presented to the user. As described above, the bounding box may include area beyond the minimal area containing the contents of the box so as to provide context for the information to the user. In other embodiments, the entire form is presented to the user with the relevant region outlined, highlighted or otherwise emphasized. In still other embodiments, the entire form is presented with the relevant region in a magnified callout. In some such embodiments, the magnified callout is offset from the location in the form image with a tail or other indicator pointing to the region in its original context. For multi-page form images, a page number on the original form may also be provided to assist the user.

In addition to the region of the form image, the information extracted from that region and the information needed is displayed to the user. Thus, by comparing the identifier and label of the box containing the needed information and the value recognized from the form image to the relevant portion of the form image, the user can verify two things: first, that the region selected corresponds to the needed box, and second, that the value recognized form that region accurately represents the value present on the form. In some embodiments, the extracted value may be a rounded version of the unrounded version on the form. In such embodiments, a rounding indicator may be presented with the automatically recognized value to help the user understand why the recognized value shows $234.00 when the form shows $233.87. In some embodiments, where multiple boxes are required for a calculated field, all of the source boxes may be presented in sequence or together. In some such embodiments, a summary describing how these boxes are combined to calculate the calculated field is also presented to provide the user with additional context.

At decision 306, it is determined how the user evaluated the automatically extracted information. If the user indicates that the incorrect region of the form was identified as corresponding to the needed box, processing proceeds to step 308. If the user indicates that the correct region of the form image was recognized but an incorrect value was extracted from the region, processing proceeds to step 310. If the user indicates that both the box was correctly identified and the value in that box was correctly recognized, processing can proceed to step 312.

At step 308, the user has indicated that the incorrect region of the form image was recognized as corresponding to the needed box. In some embodiments this error can be remediated by allowing the user to select a corrected region of the form image corresponding to the needed box. For example, the user may be presented with the opportunity to click and drag to select the region corresponding to the needed box. In other embodiments, one or more alternative regions can be presented to the user to select the correct region. In either of these embodiments, the contents of the newly identified region can be recognized and presented to the user for confirmation. In still other embodiments, the user may be presented with the option to enter the correct value for the box directly. Processing can then return to step 306 (if needed) or to step 312 (as shown, if the user entered the correct value directly).

At step 310, the user has indicated that the correct region of the form image was recognized but an incorrect value was extracted from the region. In some embodiments, this error can be remediated by performing a second optical character recognition pass on the data in the region. In some such embodiments, this pass can be made at a higher resolution or otherwise expend additional computational resources in an effort to improve the accuracy of the recognition. In other embodiments, the second pass is identical to the first pass, but with the knowledge that the text rejected by the user is incorrect. In such embodiments, this step may repeat until the user confirms that the correct value has been matched. In still other embodiments, this error can be remediated by allowing the user to enter the correct text rather than by using optical character recognition. Once the correct value has been determined, processing can proceed to step 312.

At step 312, the value determined from the needed box has been verified by the user and can be used for its intended purpose. For example, in the example above, the "gross income" value from a W-2 form can be entered on the user's 1040 form. In some embodiments, multiple values from multiple boxes from one or more different forms are used in combination. For example, if a user has two W-2 forms, then the sum of the "gross income" boxes from both W-2 forms must be entered in the 1040 form. As such, the verification steps of the W-2 forms may be interleaved such that the user verified (and, if necessary corrects) the "gross income" boxes for both W-2 forms, then the "federal tax withheld" boxes for both W-2 forms, and so on. Furthermore, the extracted regions corresponding to the form values may be retained for later recall. For example, once the user has completed their tax return and are reviewing it for accuracy, they may be able to click on the "total wages" box to display all image regions that contributed to the value contained in that box. Once the verified value has been used for the forms, processing can return to step 302 to process the region containing the next required value.

Figure 4:
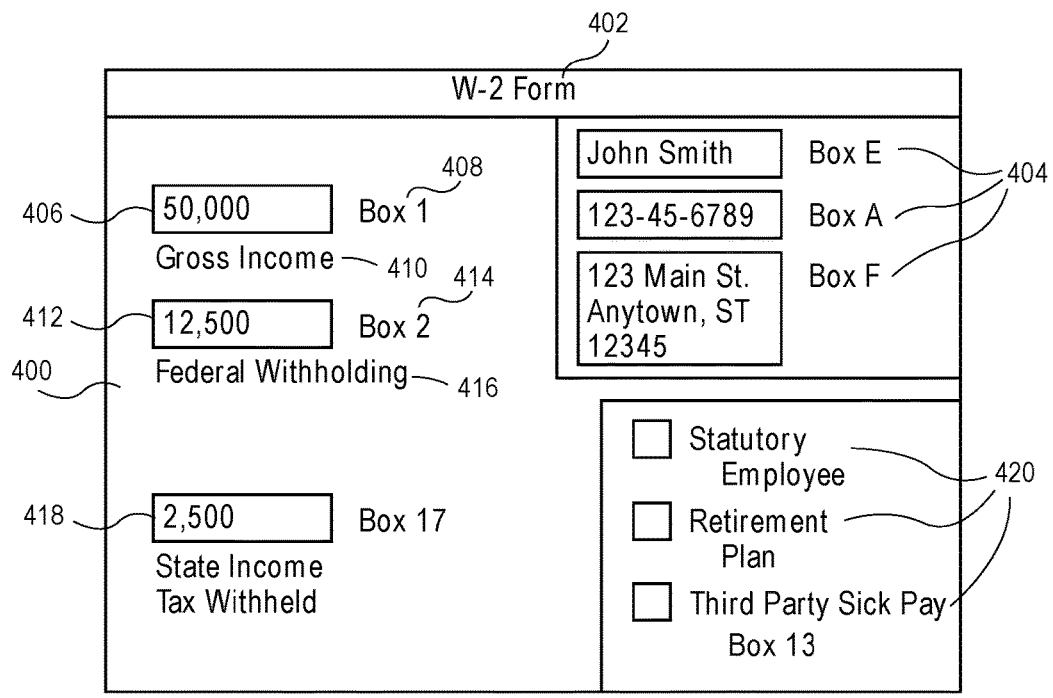
FIG. 4 depicts an exemplary form image suitable for use with embodiments of the invention.

Turning now to FIG. 4, an exemplary form image suitable for use with embodiments of the invention is depicted and referred to generally by reference numeral 400. One of skill in the art that this form is a simplified form intended only to depict certain features of the invention and that actual forms may include significantly more fields, boxes and types of entry than depicted. As depicted, form image 400 may include a variety of regions, and each region may contain some or all of a box value, a box description and a box label. For example, form title 402 may be thought of as a box with a value but no label or description. The value of this box may be used to automatically identify the form after an image is imported, as described above.

By contrast, boxes 404 include values and box labels (as depicted, "Box E," "Box A," and "Box F") but no box descriptors. For example, box labels may not be necessary when the contents of the boxes are self-explanatory. For example, the given boxes may correspond to a taxpayer's name, social security number and address, all of which may be immediately recognizable by the taxpayer. Similarly, the processing at step 302 may recognize these boxes by virtue of the formatting (for example, a box containing three digits, followed by a dash, followed by two digits, followed by another dash, followed by a final four digits may be recognized as a social security number), by virtue of the box labels, or by a combination of both. As depicted, boxes may not be in any particular order, and the order of boxes for the same form may vary from one instance of a particular type of form to another.

A representative example of a form region is depicted in value field 406, box label 408, and box descriptor 410. When breaking form 400 into regions at step 206, the respective label and description for a given value field may be identified based on proximity or relative directions. For example, the region immediately below, to the left and right, and inside a value box might be searched for a box label or descriptor. Where a box description or label is located between two value regions (as, for example, box description 410 is located between value box 406 and value box 412), preference may be given to a value region without any other nearby candidates. For example, value field 412 is adjacent to both box description 410 and box description 416, but value field 406 is only adjacent to box description 410 and so would be given precedence in assigning a value field to box description 410.

The value fields for different boxes may also contain different types of information. For example, boxes 404 all contain various alphanumeric fields (name, social security number, and address), boxes 406, 412, and 418 contain (numerical) monetary values (wages, federal withholding and state withholding), and box 420 contains a series of Boolean values with associated descriptors. In some cases (such as the latter case), the box may be broken down into a series of sub-boxes for each Boolean value. These sub boxes each have a value (checked or unchecked) and a description (e.g., "Statutory Employee"), but no box label. A wide variety of other types of values are contemplated for use with the invention; for example, the value field for a box may contain an image or other non-textual value. Broadly, any type of form containing any type of information is contemplated for use with the invention.

Figure 5A:
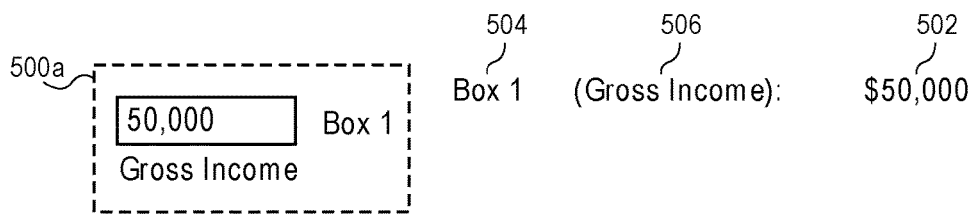
FIGS. 5a-5d depict a variety of exemplary user interfaces for presenting an automatically recognized value to a user for verification in accordance with embodiments of the invention.

Turning now to FIG. 5a, a first exemplary user interface for presenting an automatically recognized value to a user for verification is depicted and referred to generally by reference numeral 500a. In the exemplary user interface 500a, the area in the bounding box determined to correspond to a particular box is presented to the user, together with the value 502 determined via optical character recognition (or other machine recognition) for that field so that the user can confirm that the value in the form image and the automatically recognized value match. Also presented are the label 504 and description 506 for the needed box so that the user can confirm that the correct region of the form has been identified for the needed box.

Figure 5B:

Turning now to FIG. 5b, a second exemplary user interface for presenting an automatically recognized value to a user for verification is depicted and referred to generally by reference numeral 500b. User interface 500b is generally similar to user interface 500b except that a portion of the area outside the bounding box identified as corresponding to the needed box is also presented to the user for context. As depicted, a rectangular region around the bounding box is presented to the user. However, in other embodiments, the region displayed may be elliptical, circular, polygonal, or any other shape.

Figure 5C:
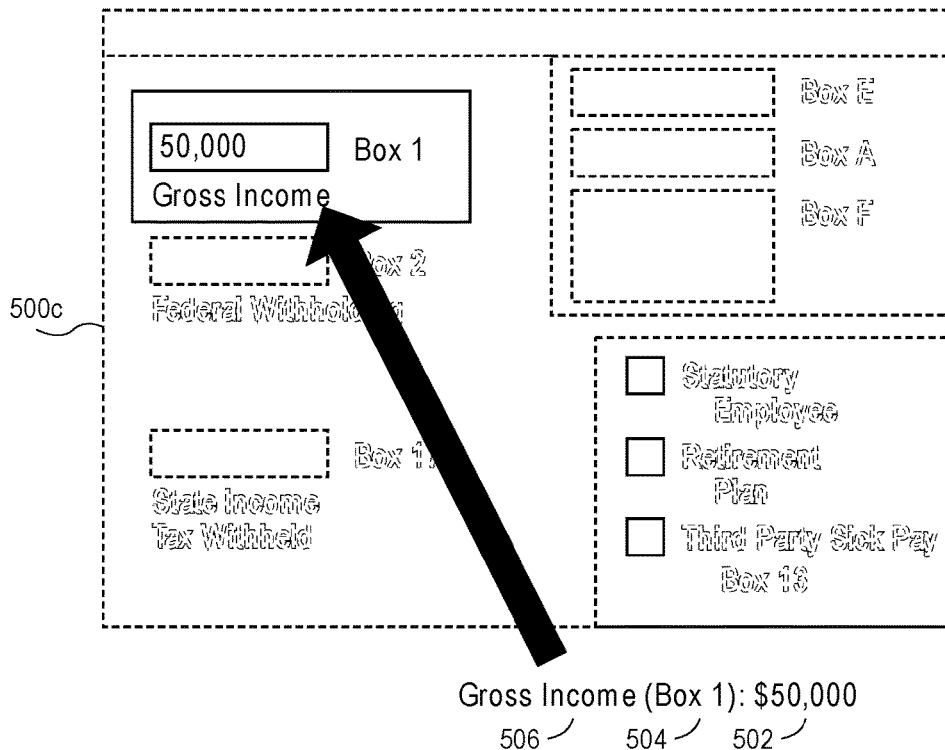

Turning now to FIG. 5c, a third exemplary user interface for presenting an automatically recognized value to a user for verification is depicted and referred to generally by reference numeral 500c. In this embodiment, the entire form image 400 is presented to the user with the area outside the bounding box for the needed box faded into transparency so as to emphasize the area inside the bounding box. In some embodiments, the area inside the bounding box is instead highlighted so as to emphasize it. In still other embodiments, the border of the bounding box is outlined in a contrasting color so as to allow the user to easily find the indicated box. Broadly, any visual indicator of the bounding box in the context of the form image is contemplated as being within the score of the invention. An alternate depiction of the automatically recognized box label 504, box description 506, and box value 502 is also included. One of skill in the art that any or all of these may be presented for verification, and the may be presented in any order or arrangement.

Figure 5D:
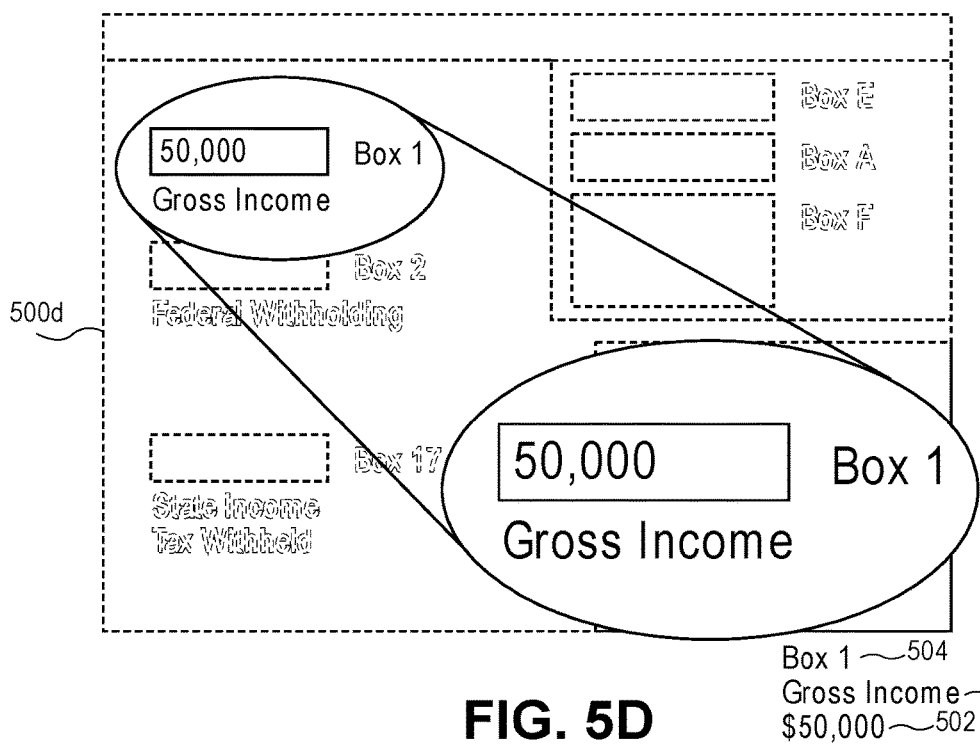

Turning now to FIG. 5d, a fourth exemplary user interface for presenting an automatically recognized value to a user for verification is depicted and referred to generally by reference numeral 500d. In this embodiment, the entire form image 400 is presented for context as in user interface 500c. Also like user interface 500c, the area in the bounding box for the needed box may be highlighted or the area outside of it faded into transparency. However, in user interface 500d, a zoomed-in callout of the area is also presented to the user to more easily review the relevant portions of the image and compare them to the automatically recognized box label 504, box description 506, and box value 502.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of presenting a user interface for verifying automatically recognized information, comprising the steps of:
 receiving a form image of a form, the form including plurality of values and a corresponding plurality of descriptions for the plurality of values;
 identifying a plurality of regions of the form image corresponding to the plurality of values,
 wherein each region of the form image contains an image of a value and a description corresponding to the region;
 performing automatic recognition of each region to obtain automatically recognized values and automatically recognized descriptions of each region;
 determining if the automatically recognized values are correct or incorrect based on a comparison of the automatically recognized values for each region with the form image after automatic recognition;
 determining a needed value based on the comparison of the form image and the automatically recognized regions;
 identifying a region of the automatically recognized regions corresponding to the needed value,
 wherein the identified region includes an automatically recognized value and an automatically recognized description of the identified region;
 presenting a user interface to the user comprising:
  the plurality of regions of the form image;
  the identified region of the form image corresponding to the needed value,
  wherein the identified region is automatically highlighted prior to input from the user;
  the automatically recognized value for the identified region;
  the automatically recognized description for the identified region;
  a first control allowing the user to accept the automatically recognized value,
  wherein a plurality of regions of the form image that do not correspond to the need value are not presented via the user interface.

2. The method of claim 1, wherein the identified region is identified based on an automatically identified label for the region.

3. The method of claim 2, further comprising the step of presenting, in the user interface, the automatically identified label for the region.

4. The method of claim 1, further comprising the steps of presenting, in the user interface:
 a second control allowing the user to reject the automatically recognized value; and
 a third control allowing the user to provide a corrected value for the identified region.

5. The method of claim 1, further comprising the steps of presenting, in the user interface:
   a second control allowing the user to reject the identified region; and
   a third control allowing the user to provide a corrected region of the form image corresponding to the needed value.

6. The method of claim 5, further comprising the steps of presenting, in the user interface:
   an automatically recognized value for the corrected region; and
   a fourth control allowing the user to accept the automatically recognized value for the corrected region as correct.

7. The method of claim 1, wherein the identified region is presented as an emphasized region in the form image.

8. One or more non-transitory computer-readable media storing computer-executable instructions for a method of presenting a user interface for verifying automatically recognized information that, when executed:
   receive a form image of a form, the form including plurality of values and a corresponding plurality of labels for the plurality of values;
   identifying a plurality of regions of the form image corresponding to the plurality of values,
   wherein each region of the form image contains an image of a value and a label corresponding to the region;
   for each of the plurality of regions, perform automatic recognition of the value and the label for the region to obtain an automatically recognized value for the region and an automatically recognized label for the region;
   determining if the automatically recognized value is correct or incorrect based on a comparison of the automatically recognized value for the region with the form image after automatic recognition;
   determining a needed value based on the comparison;
   identify a region of the plurality of regions of the form image corresponding to the needed value, and
   presenting a user interface to the user comprising:
   the plurality of regions of the form image;
   the identified region of the form image corresponding to the needed value,
   wherein the identified region is automatically magnified prior to input by the user;
   an automatically recognized value for the identified region;
   an automatically recognized label for the identified region;
   a first control allowing the user to accept the automatically recognized value and an automatically recognized label.

9. The media of claim 8, wherein the user interface further comprises:
   a second control allowing the user to reject the automatically recognized value; and
   a third control allowing the user to provide a corrected value for the identified region.

10. The media of claim 8, wherein the user interface further comprises:
    a second control allowing the user to reject the identified region; and
    a third control allowing the user to provide a corrected region of the form image corresponding to the needed value.

11. The media of claim 10, wherein the computer-executable instructions, when executed, further:
    perform automatic recognition of a value for the corrected region; and
    present, in the user interface:
       the automatically recognized value for the corrected region; and
       a fourth control allowing the user to accept the automatically recognized value for the corrected region as correct.

12. The media of claim 8, wherein the step of performing automatic recognition of the value for the region and the label for the region comprises using optical character recognition to determine at least one of the value for the region and the label for the region.

13. The media of claim 8, wherein the step of performing automatic recognition of the value for the region and the label for the region further comprises preforming automatic recognition of a description for the value.

14. The media of claim 8, wherein the identified region of the form corresponding to the needed region is presented with a surrounding portion of the form image.

15. A system comprising:
    a user interface comprising:
       an identified region of a form image corresponding to a needed value;
       an automatically recognized value for the identified region;
       a first control allowing a user to accept the automatically recognized value,
       wherein a plurality of regions of the form image that do not correspond to a needed value are not presented via the user interface; and
    one or more non-transitory computer-readable media storing computer-executable instructions that, when executed perform a method of presenting a user interface for verifying automatically recognized information, the method comprising the steps of:
       identifying the plurality of regions of the form image of a form, wherein the form includes a plurality of values, and wherein each region of the plurality of regions corresponds to a value of the plurality of values;
       performing automatic recognition of the plurality of regions of the form image to obtain automatically recognized values;
       determining if the automatically recognized values are correct or incorrect based on a comparison of the automatically recognized values for each region with the form image after automatic recognition;
       determining the needed value based on the comparison of the form image and the automatically recognized plurality of regions;
       identifying a region of the plurality of regions of the form image corresponding to the needed value.

16. The system of claim 15, wherein the method further comprises the steps of presenting, in the user interface:
    a second control allowing the user to reject the automatically recognized value; and
    a third control allowing the user to provide a corrected value for the identified region.

17. The system of claim 15, further comprising the steps of presenting in the user interface:
    a second control allowing the user to reject the identified region; and
    a third control allowing the user to provide a corrected region of the form image corresponding to the needed value.

18. The system of claim 17, wherein the method further comprises the steps of presenting, in the user interface:
- an automatically recognized value for the corrected region; and
- a fourth control allowing the user to accept the automatically recognized value for the corrected region as correct.

19. The system of claim 15, wherein the method further comprises the step of presenting, in the user interface, an automatically recognized label for the automatically identified value.

20. The system of claim 15, wherein the method further comprises the step of presenting, in the user interface, an automatically recognized description for the automatically recognized value.

* * * * *